(12) United States Patent
Astely et al.

(10) Patent No.: US 8,358,979 B2
(45) Date of Patent: Jan. 22, 2013

(54) METHOD AND APPARATUS FOR MEASURING INTERFERENCE IN A TELECOMMUNICATIONS SYSTEM

(75) Inventors: David Astely, Bromma (SE); David Hammarwall, Stockholm (SE); George Jöngren, Stockholm (SE); Per Magnus Lundevall, Sollentuna (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 497 days.

(21) Appl. No.: 12/365,703

(22) Filed: Feb. 4, 2009

(65) Prior Publication Data

US 2010/0197330 A1 Aug. 5, 2010

(51) Int. Cl.
H04B 1/00 (2006.01)
(52) U.S. Cl. .............. 455/63.1; 455/67.13; 370/330
(58) Field of Classification Search ............ 455/63.1, 455/67.13; 370/330
See application file for complete search history.

(56) References Cited

U.S. PATENT DOCUMENTS

| 5,605,729 A | | 2/1997 | D'Amico et al. |
| 5,848,357 A | * | 12/1998 | Dehner et al. ............... 455/447 |
| 7,639,660 B2 | * | 12/2009 | Kim et al. ................... 370/343 |
| 7,885,230 B2 | * | 2/2011 | Seo et al. .................... 370/329 |
| 7,940,643 B2 | * | 5/2011 | Lee et al. .................... 370/208 |
| 7,940,740 B2 | * | 5/2011 | Krishnamurthy et al. .... 370/344 |
| 2005/0013283 A1 | | 1/2005 | Yoon et al. |
| 2005/0032540 A1 | | 2/2005 | Lee et al. |
| 2007/0270100 A1 | | 11/2007 | Agrawal et al. |

FOREIGN PATENT DOCUMENTS

WO WO 2007/073040 A1 6/2007

* cited by examiner

Primary Examiner — Kenneth B. Wells

(57) ABSTRACT

A method for facilitating noise and interference measurements on an air interface of a wireless network includes obtaining information relating to a time-varying layout of a silent resource element (RE) grid and taking a presence of a silent RE grid into account in the reception of a control or a data channel.

18 Claims, 3 Drawing Sheets

METHOD AND APPARATUS FOR MEASURING INTERFERENCE IN A TELECOMMUNICATIONS SYSTEM

TECHNICAL FIELD

The present invention relates to a method and arrangement in a telecommunications system. (As used herein, references to the "present invention" or "invention" relate to exemplary embodiments and not necessarily to every embodiment encompassed by the appended claims.) More specifically, the present invention relates to facilitating Inter-cell interference measurement.

BACKGROUND

This section is intended to introduce the reader to various aspects of the art that may be related to various aspects of the present invention. The following discussion is intended to provide information to facilitate a better understanding of the present invention. Accordingly, it should be understood that statements in the following discussion are to be read in this light, and not as admissions of prior art.

The invention is described with some references to LTE, but it should be noted that it conceivably can be applied to other systems as well, including, e.g. WCDMA. It should also be noted that the invention is equally applicable both in the downlink as well as the uplink of a wireless system.

Signal and channel quality estimation is a fundamental part of a modern wireless system. The nose and interference is used not only in the demodulator, but is also an important quantity when estimating, for example, the channel quality indicator (CQI). The following is noted with LTE in mind, but the principles are valid for most wireless systems.

The interference can be estimated from the common reference symbols (RS) that are present in the time—frequency grid of an OFDM based system (e.g., LTE). An element in the time—frequency grid is referred to as a resource element (RE). The received signal in a RE can be written as r=Hs+n, where H is the channel response and s represents the transmitted symbols. The term, n, is the (unknown) noise and interference. The noise and interference show different characteristics in resource elements (RE) that hold RS, data, and control signaling; we therefore denote the received noise/interference for the different signaling types by I_RS, I_d, and I_control, respectively.

It is noted that the interference term in a RE containing RS, I_RS, at a specific user equipment (UE) can be estimated by the UE since s are known symbols and H is given by the channel estimator. It is further noted that the interference on REs with data (that is scheduled for the UE in question), I_d, also can be measured as soon as the (data) symbols, s, are detected (at this moment they can be regarded as known symbols). Similarly, to estimate I_control, the control symbols must first be detected.

BRIEF SUMMARY OF THE INVENTION

The statistical characteristics of the (inter-cell) interference may be significantly different, depending on whether the interference originates from
  1. reference symbols from neighbouring cells
  2. data signalling from neighbouring cells
  3. control signalling from neighbouring cells
Each of these three categories can have different transmission power and spatial characteristics.

For accurate data channel CQI computation the UE must have good statistics of the interference that hits the data channel (which is a mixture of the three categories mentioned above), I_d. Ultimately, these interference statistics should be measured on the data channel itself; however, this measurement is limited to resource entities (i.e., time-frequency slots) that contain data scheduled to the particular user. The limited number of interference samples can significantly penalize the accuracy of the statistics estimate. Moreover, in multiuser-MIMO (i.e., spatial division multiple access) systems, several users may be assigned the same data REs, which in effect prohibits the UE from separating the inter-cell interference from the intra-cell interference, if the measurement is performed on data REs.

Alternatively, the interference measurement can be performed on REs containing a RS. However, the statistics of the interference that hits the RS may have significantly different statistics than the interference on the data channel (or the control channel). There is a limited set of RS, and in particular for MIMO, where the position holding a RS on one antenna is empty for a neighboring antenna, therefore the interference hitting a RS will to a larger extent come from RSs of the neighboring cells. In particular in lightly loaded systems, I_RS, may be significantly different (typically substantially larger) than I_d, because possibly data is not allocated to all resource blocks (RB) in the neighboring cells. The statistics of the measured interference term may therefore deviate significantly from the interference that hits the data channel. The RS grid for a RB in case of 1, 2 and 4 Tx antennas is illustrated in FIG. 1. Between cells, the RS is shifted in the frequency domain.

For two Tx antennas only three frequency shifts for common RS exists. This will lead to that not all data interference can be measured. Furthermore, the first three OFDM symbols might see control channel interference instead of data interference. Since control signaling may be differently power controlled than the data, the interference estimate obtained on these RS may not reflect the interference present when data is transmitted. If common RS in the later part of sub-frame is removed (for example because dedicated RS are inserted instead) it might be necessary to measure interference on data REs.

According to one aspect of the present invention a cell specific time-varying grid of data REs (referred to as the silent RE grid in the following) is introduced, for which no data is allocated; that is, the transmitter will be silent on this grid. The grid is known to both the receiving and the transmitting unit.

According to a further aspect of one embodiment of the present invention the receiving unit is able to measure the statistics of the signal that is received on the silent RE grid; this signal originates completely from inter-cell signals that interfere with the data channel.

The measured inter-cell interference can, for example, be used as a basis for channel quality (CQI) reporting and/or for interference suppression purposes in the receiving unit.

One advantage according to an aspect of an embodiment of the present invention is that a statistics measurement, performed on the silent RE grid, is computationally trivial, because no data must be decoded to obtain the residual noise and interference.

According to a further aspect of another embodiment of the present invention, the silent RE grid could be randomized in consecutive (in frequency and time) resource blocks, to minimize the effects of potentially overlapping grids of neighbouring cells.

According to a further aspect of another embodiment of the present invention, the layout of the cell specific silent RE grid can be derived with little, or no, signalling overhead; it could for example be derived from the cell ID and other information that is known to both the receiving and the transmitting unit.

According to a further aspect of another embodiment of the present invention, a similar approach can be used to estimate the interference that hit the control channel, I_controls by introducing another silent RE grid on the control channel (e.g., potentially up to the first three ODFM symbols in an LTE subframe).

According to one aspect of the present invention a method in a receiving unit of a wireless network, for facilitating noise and interference measurements on an air interface is provided. The method comprises the steps of obtaining information relating to a layout of a silent RE grid, and taking the presence of a silent RE grid into account in the reception of a control or a data channel.

According to another embodiment of the present invention, the step of obtaining information comprises using a pseudo-random sequence to generate said layout of said silent RE grid, and synchronising said pseudo-random sequency in each frame by deriving a seed for said pseudo-random sequency from a Cell ID and a Frame Index.

According to another embodiment of the present invention the step of obtaining information comprises receiving said layout of said silent RE grid through signalling.

According to another embodiment of the present invention the method includes the step of collecting statistics relating to the inter-cell interference based on measurements on said silent RE grid, and using said statistics to estimate any or all of a channel quality indicator, the inter-cell interference power that hits the channel, the co-variance matrix of the inter-cell interference that hits the channel, the full probability distribution of the inter-cell interference.

Further characteristics of the invention and advantages thereof will be evident from the following detailed description of embodiments of the invention.

BRIEF DESCRIPTION OF THE DRAWINGS

The present invention will become more fully understood from the detailed description of embodiments of the present invention given herein below and the accompanying figures, which are given by way of illustration only, and thus are not limitative of the present invention.

DETAILED DESCRIPTION

Figure 1:
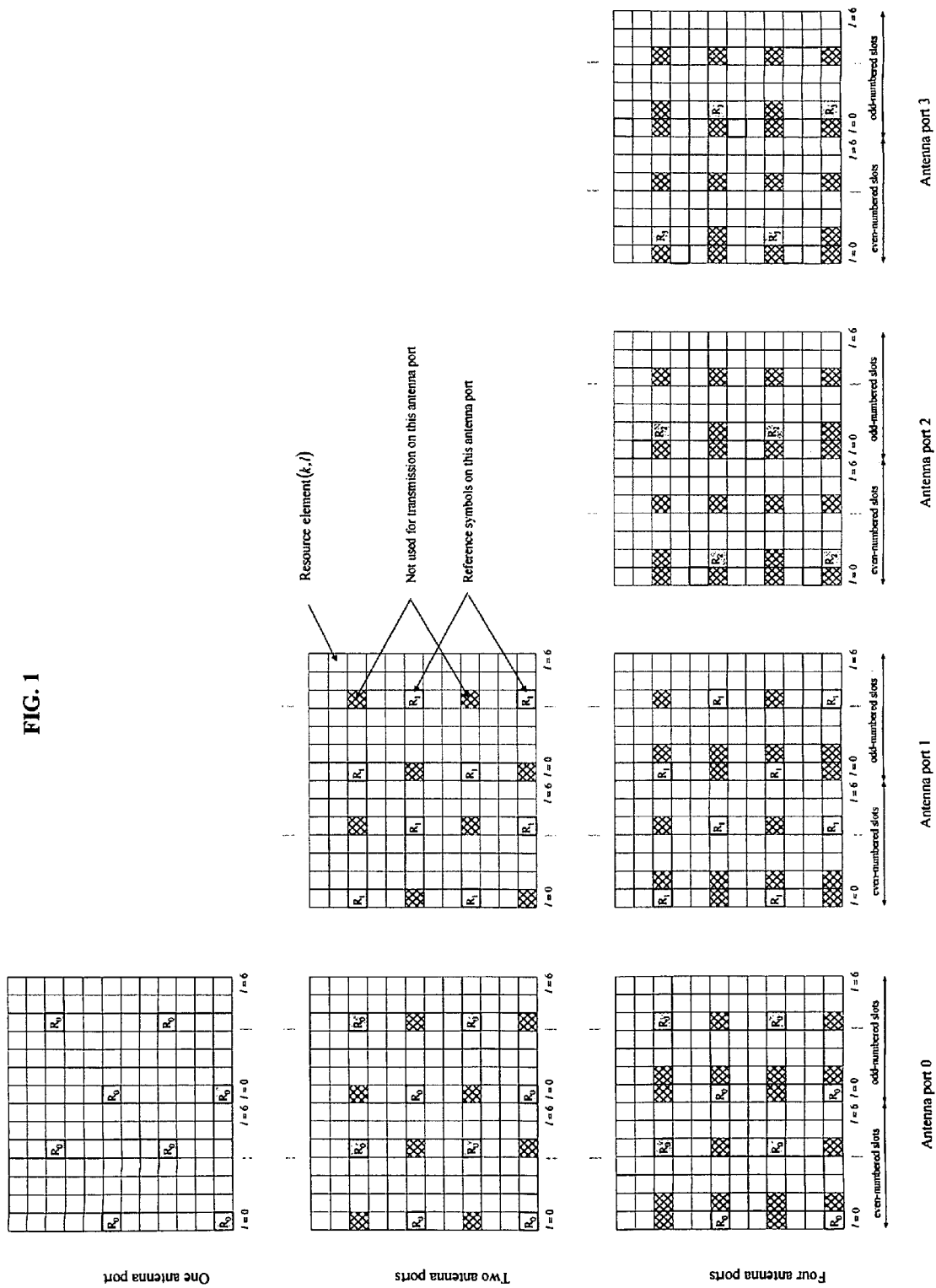
FIG. 1 is an RS grid for a RB in case of 1, 2 and 4 Tx antennas.
Figure 2:
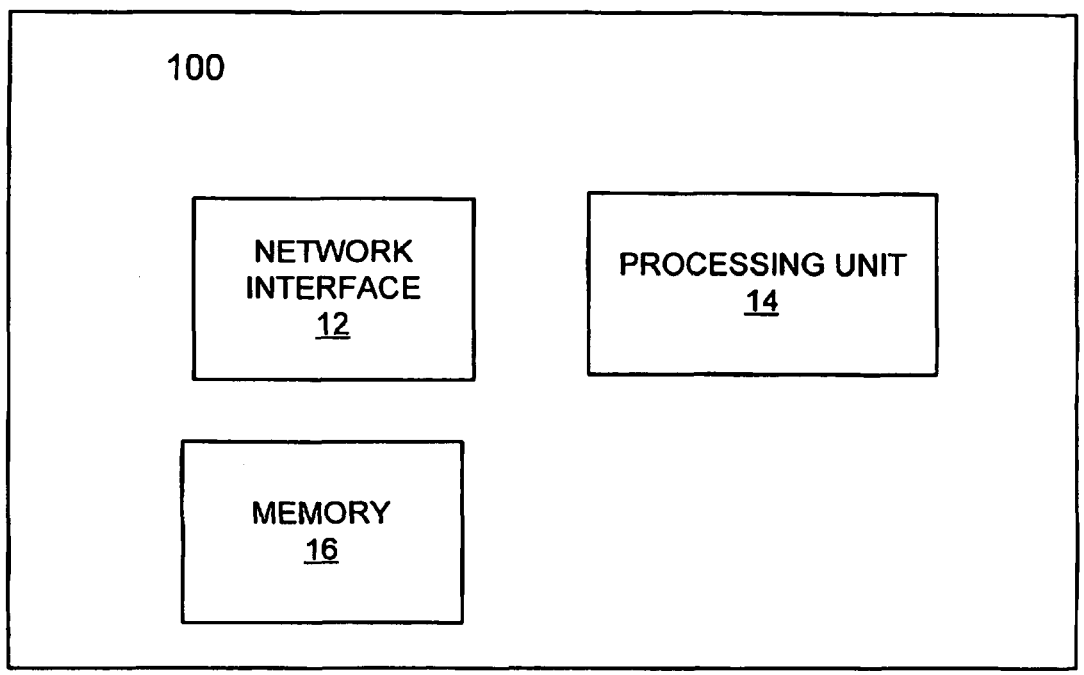
FIG. 2 is a block diagram of a receiver unit of the present invention.
Figure 3:
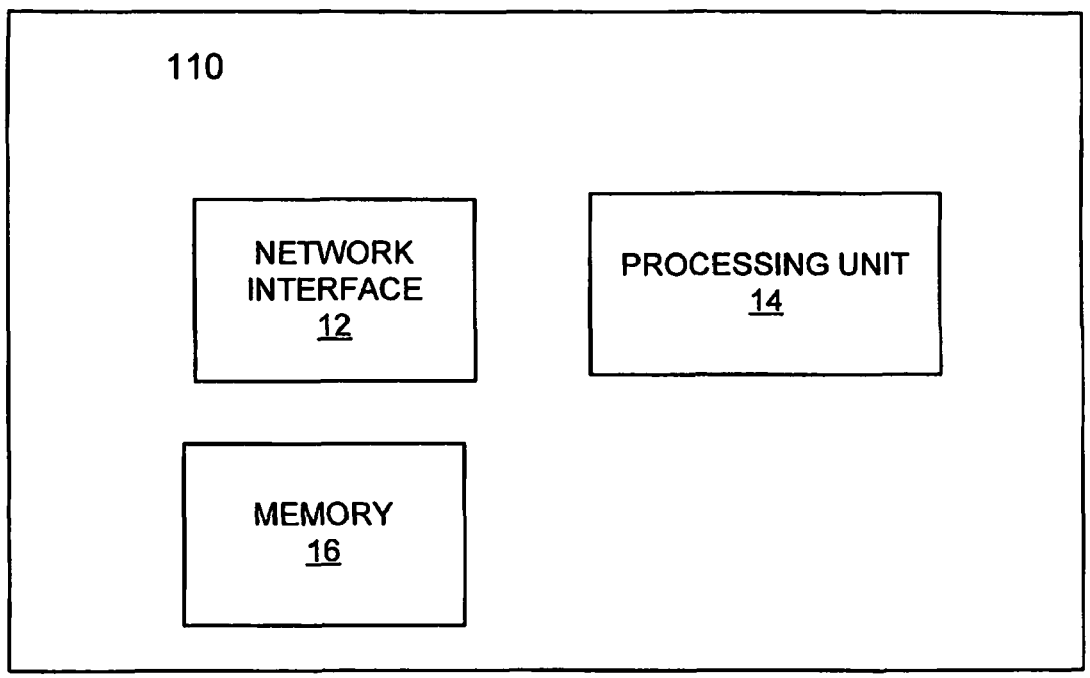
FIG. 3 is a block diagram of a transmitting unit of the present invention.

Referring now to the drawings wherein like reference numerals refer to similar or identical parts throughout the several views, and more specifically to FIG. 2 thereof, there is shown a receiving unit 100, or a transmitting unit 110, as shown in FIG. 3, of a wireless network, for facilitating noise and interference measurements on an air interface. The receiving unit 100 comprises a network interface 12 which obtains information relating to a time-varying layout of a silent resource element (RE) grid. The receiving unit 100 comprises an electronic memory 16 having code in communication with the network interface 12 which stores the information. The receiving unit 100 comprises a processing unit 14 in communication with the electronic memory 16 that takes a presence of a silent RE grid into account in the reception of a control or a data channel. In the transmitting unit 110, the processing unit 14 takes the presence of a silent RE grid into account in the transmission of a control or a data channel The processing unit 14 can use a pseudo-random sequence to generate the layout of the silent RE grid, and synchronizing the pseudo-random sequence by deriving a seed for the pseudo-random sequence from parameters. The pseudo-random sequence can be synchronized in each frame by the processing unit 14 based on the parameters that includes a cell ID and a frame index. The layout of the silent RE grid can be received through signaling by the network interface 12.

The electronic memory 16 can collect statistics relating to inter-cell interference based on measurements on the silent RE grid. The processing unit 14 can use the statistics with the code to estimate any or all of: a channel quality indicator, inter-cell power that hits a channel, a co-variance matrix of the inter-cell interference that hits the channel, a full probability distribution of the Inter-cell interference; and send the signal through the network interface 12. The processing unit 14 can randomize the silent RE grid in consecutive, in frequency and time, resource blocks (RBs). The processing unit 14 can derive the silent RE grid with essentially no signaling overhead.

The processing unit 14 can introduce another silent RE grid on a control channel to estimate the interference that hits the control channel using the code in the electronic memory 16. The processing unit 14 can coordinate each silent grid of neighboring cells in the wireless system such that there is no significant overlap. For each subframe, the processing unit 14 can group resource blocks into resource windows where each resource window is a group of contiguous, in frequency, resource blocks; and the number of resource blocks in each resource window may be configured semi-statically. Each resource window has the same number of silent REs, and are configured semi-statically.

The present invention pertains to a method in a receiving unit 100 or a transmitting unit 110 of a wireless network, for facilitating noise and interference measurements on an air interface. The method comprises the steps of obtaining information relating to a time-varying layout of a silent resource element (RE) grid. There is the step of taking a presence of a silent RE grid into account in the reception of a control or a data channel.

The step of obtaining information can include the steps of using a pseudo-random sequence to generate said layout of said silent RE grid, and synchronizing the pseudo-random sequence by deriving a seed for the pseudo-random sequence from parameters known to both a receiving unit 100 and a transmitting unit 110. The pseudo-random sequence can be synchronized in each frame based on the parameters that include a cell ID and a frame index. The layout of the silent RE grid can be received through signaling.

There can be the steps of collecting statistics relating to inter-cell interference based on measurements on the silent RE grid in an electronic memory 16 having codes using the statistics with the code to estimate any or all of: a channel quality indicator, inter-cell power that hits a channel, a co-variance matrix of the inter-cell interference that hits the channel, a full probability distribution of the Inter-cell interference; and sending the signal. There can be the step of randomizing the silent RE grid in consecutive, in frequency and time, resource blocks (RBs). There can be the step of deriving the silent RE grid with essentially no signaling overhead.

There can be the step of introducing another silent RE grid on a control channel to estimate the interference that hits the control channel using code in an electronic memory 16. There can be the step of coordinating each silent grid of neighboring cells in said wireless system such that there is no significant overlap. For each subframe, there can be the step of grouping resource blocks into resource windows where each resource window is a group of contiguous, in frequency, resource blocks; and the number of resource blocks in each resource window may be configured semi-statically. Each resource window has the same number of silent REs, and are configured semi-statically.

In more detail, the invention contains the following general steps, and example realizations. In the following we focus on the data channel, but the same approach, with straightforward modifications, can be applied to estimate the interference that hit the control channel.

Designing the Silent Grids

Several aspects should be kept in mind when designing the silent grid.

The interference on the silent grid should reflect the interference statistics of the data channel as a whole. Therefore distribution of silent REs over the data channel should preferably be as uniform as possible.

According to one embodiment the grid could be pseudo-random in the sense that it should change over time and/or frequency to avoid significant long-term overlap with silent grids of neighbouring cells.

It should be noted that the invention is not limited to pseudo-random grids; for example, an alternative method is to coordinate the silent grid of neighbouring cells such that no significant overlap occurs and then signal the selected silent RE grid to the UEs dynamically or semi-statically. Such an approach could however possibly require careful planning.

According to a further embodiment the UEs should be able to readily derive which silent grid is being used, with little or preferably no control signalling overhead.

Alternatively it is conceivable to use explicit signalling of the silent grid layout.

According to a further embodiment clustering of the silent REs in one or a few RBs should be avoided for improved sample statistics.

A simple scheme, according to one embodiment, that achieves some or all of the criteria mentioned above is as follows:

For each subframe, the RBs are grouped into resource windows (RW);
Each RW is a group of contiguous (in frequency) RBs;
The number of RBs in each RWV is configured semi-statically;
As special cases, there could be only one RW that represents the entire system bandwidth, or there could be a RW for each RB.
For each RW, all REs that are not control or RS signalling are enumerated;
In each RW, a specified number of silent REs are selected from the set of enumerated REs using a pseudo-random number generator that generates numbers uniformly in the range of the enumerated data REs. Alternatively, selection of the silent RE are coordinated. The grouping into RWs will ensure that clustering of silent REs is sufficiently limited. The number of selected silent REs could be fixed, derived from the number of RBs in each RW, or possible semi-statically configured.

The scheme can also readily be generalized to let a RW constitute only a part of a RB in the time domain; for example, the OFDM symbols in the RB can be grouped so that symbols including RS symbols, and data symbols, are mapped to RW_RS and OFDM symbols carrying only data are mapped to RW_d. It is also conceivable to use a different number of silent REs in RW_RS and RW_d. Such a separation of the OFDM symbols can be useful since the inter-cell interference that hits RW_RS and RW_d will have different statistics.

According to a further embodiment the power that is saved by remaining silent on some REs can be redistributed to boost the power on other REs that carry data or reference symbols. Such power reallocation combined by the preceding method of assigning different OFDM symbols to different RW categories can be a useful approach to reallocate the power within OFDM symbols, for example in order to support different powers on the RE carrying RS and the REs carrying data in the same OFDM symbol.

Determining and Configuring the Silent RE Grid

As indicated in the preceding, it is beneficial to let the silent RE grid be generated pseudo-randomly to transparently avoid consistent grid-overlap with neighbouring cells. It is therefore necessary to synchronize the random generators used at the NodeB with those in the UEs.

According to a further embodiment of the present invention a simple scheme for synchronizing the pseudo-random generators is to reinitialize the pseudo-random generators in each frame using a seed that is derived from 1. Cell ID, to provide uniqueness for each cell.
2. Frame index, to provide hopping over time.

Both the cell ID and the frame index are available at the UEs. Note that any re-initialization interval of the number generator can be used, as long as there is a suitable index, available at the UE, that can be used to progress the seed over time; this includes, but is not limited to, a subframe, or groups of frames.

If more flexibility is desired, such as configurable silent RE grid densities, some grid parameters could be set semi-statically using higher layer control signalling.

Measuring the Interference

The silent RE grid is used by the UEs to collect statistics of the inter-cell interference that hits the data channel. If the silent grid is uniformly distributed over the data channel, as suggested in the preceding, the interference samples collected in the silent grid will, over time, be the same as the interference that hits the data channel as a whole. These samples can thus be utilized by the UE to estimate:

The inter-cell interference power that hits the data channel.
The co-variance matrix of the inter-cell interference that hits the data channel. This is particularly useful if the UE has multiple antennas
The full probability distribution of the inter-cell interference.
The measured statistics can be average over time and frequency; similar to the approach proposed in *R*1-074855, *CQI Measurement Methodology, Ericsson,* 3*GPP RAN*1#51, *Korea.*

According to one embodiment the interference measurement on the silent RE grid can, for example, be used as a basis for the CQI reporting if it is combined with measurements of the received power of the data signals. Such a signal power estimate can, for instance, be obtained from measurements on the RS, taking potential signalling-power normalizations effects into account.

Exemplary improvements of different aspects and embodiments of the present invention is improved capacity, coverage and quality, enabled through more accurate link adaptation, power control and scheduling, in turn enabled by more accurate interference estimation.

Moreover, the invention allows for inter-cell interference measurements directly on the data channel with small computational-complexity. The scheme also transparently manages inter-cell interference measurements in multiuser-MIMO allocation scenarios.

Although the invention has been described in detail in the foregoing embodiments for the purpose of illustration, it is to be understood that such detail is solely for that purpose and that variations can be made therein by those skilled in the art without departing from the spirit and scope of the invention except as it may be described by the following claims.

The invention claimed is:

1. A method in a receiving unit of a wireless network, for facilitating noise and interference measurements on an air interface, said method comprising the steps of:
   obtaining, at a receiver, information relating to a time-varying layout of a first silent resource element (RE) grid for a first cell;
   measuring a signal that is received on a data channel during an RE for which no data transmission is allocated for the first cell according to the silent RE grid;
   determining an amount of inter-cell interference experienced by the receiver based on the signal measurement;
   taking the determined inter-cell interference into account in the reception of a control or a data channel; and
   introducing a second silent RE grid on a control channel to estimate an interference that hits the control channel using code in an electronic memory.

2. The method according to claim 1, wherein said step of obtaining information comprises the steps of using a pseudo-random sequence to generate said layout of said silent RE grid, and synchronizing said pseudo-random sequence by deriving a seed for said pseudo-random sequence from parameters.

3. The method according to claim 2, wherein said pseudo-random sequence is synchronized in each frame based on said parameters that include a cell ID and a frame index.

4. The method according to claim 1, wherein said layout of said silent RE grid is received through signaling.

5. The method according to claim 1, wherein determining the amount of inter-cell interference experienced by the receiver comprises:
   collecting statistics relating to inter-cell interference based on measurements on said silent RE grid in an electronic memory having code; and
   using said statistics with the code to estimate any or all of: a channel quality indicator, inter-cell power that hits a channel, a co-variance matrix of the inter-cell interference that hits the channel, a full probability distribution of the Inter-cell interference.

6. The method according to claim 1 including the step of randomizing the silent RE grid in consecutive, in frequency and time, resource blocks (RBs).

7. The method according to claim 1 including the step of deriving the silent RE grid with essentially no signaling overhead.

8. The method as described in claim 1 including the step of coordinating each silent grid of neighboring cells in said wireless system such that there is no significant overlap.

9. The method as described in claim 1, wherein for each subframe, grouping resource blocks into resource windows where each resource window is a group of contiguous, in frequency, resource blocks; and the number of resource blocks in each resource window may be configured semi-statically, each resource window having a same number of silent REs, and are configured semi-statically.

10. A receiving unit of a wireless network, for facilitating noise and interference measurements on an air interface comprising:
    a network interface configured to obtain information relating to a time-varying layout of a first silent resource element (RE) grid for a first cell;
    an electronic memory having code configured to communicate with the network interface and to the information; and
    a processing unit configured to:
       measure a signal that is received on a data channel during an RE for which no data transmission is allocated for the first cell according to the silent RE grid;
       determine an amount of inter-cell interference experienced by the receiver based on the signal measurement;
       take the determined inter-cell interference into account in the reception of a control or a data channel; and
       introducing a second silent RE grid on a control channel to estimate an interference that hits the control channel using code in an electronic memory.

11. The receiving unit as described in claim 10 wherein the processing unit is further configured to use a pseudo-random sequence to generate the layout of the silent RE grid, and synchronizes the pseudo-random sequence by deriving a seed for the pseudo-random sequence from parameters.

12. The receiving unit as described in claim 11 wherein the processing unit is configured to synchronize the pseudo-random sequence in each frame based on parameters that include a cell ID and a frame index, and the network interface is configured to receive the layout of the silent RE grid through signaling.

13. The receiving unit as described in claim 12 wherein the electronic memory is configured to collect statistics relating to inter-cell interference based on measurements on the silent RE grid.

14. The receiving unit as described in claim 13 wherein the processing unit is configured to use the statistics with the code to estimate any or all of: a channel quality indicator, inter-cell power that hits a channel, a co-variance matrix of the inter-cell interference that hits the channel, a full probability distribution of the Inter-cell interference; and to send the signal through the network interface.

15. The receiving unit as described in claim 14 wherein the processing unit is configured to randomize the silent RE grid in consecutive, in frequency and time, resource blocks (RBs).

16. The receiving unit as described in claim 15 wherein the processing unit is configured to derive the silent RE grid with essentially no signaling overhead.

17. The receiving unit as described in claim 10 wherein the processing unit is configured to coordinate each silent grid of neighboring cells in the wireless system such that there is no significant overlap.

18. The receiving unit as described in claim 17 wherein for each subframe, the processing unit is configured to group resource blocks into resource windows where each resource window is a group of contiguous, in frequency, resource blocks; and wherein the number of resource blocks in each resource window may be configured semi-statically, and each resource window has a same number of silent REs, and are configured semi-statically.

* * * * *

UNITED STATES PATENT AND TRADEMARK OFFICE
CERTIFICATE OF CORRECTION

PATENT NO. : 8,358,979 B2  
APPLICATION NO. : 12/365703  
DATED : January 22, 2013  
INVENTOR(S) : Astely et al.

Page 1 of 1

It is certified that error appears in the above-identified patent and that said Letters Patent is hereby corrected as shown below:

In the Specifications:

In Column 1, Line 31, delete "nose" and insert -- noise --, therefor.

In Column 3, Line 10, delete "ODFM" and insert -- OFDM --, therefor.

In Column 3, Line 32, delete "of" and insert -- of: --, therefor.

In Column 3, Line 52, delete "invention," and insert -- invention. --, therefor.

In Column 4, Line 5, delete "channel" and insert -- channel. --, therefor.

In Column 4, Line 58, delete "codes" and insert -- code; --, therefor.

In Column 5, Line 49, delete "RWV" and insert -- RW --, therefor.

In Column 6, Line 49, delete "antennas" and insert -- antennas. --, therefor.

Signed and Sealed this  
Fourteenth Day of May, 2013

Teresa Stanek Rea  
*Acting Director of the United States Patent and Trademark Office*

UNITED STATES PATENT AND TRADEMARK OFFICE
CERTIFICATE OF CORRECTION

PATENT NO. : 8,358,979 B2  
APPLICATION NO. : 12/365703  
DATED : January 22, 2013  
INVENTOR(S) : Astely et al.

Page 1 of 1

It is certified that error appears in the above-identified patent and that said Letters Patent is hereby corrected as shown below:

IN THE SPECIFICATION

In Column 1, Line 4, insert the following paragraph:

--This application claims the benefit of US Provisional Application No. 61/026,230, filed February 5, 2008.--

Signed and Sealed this
Tenth Day of May, 2016

Michelle K. Lee
*Director of the United States Patent and Trademark Office*